(12) United States Patent
Tsirkin

(10) Patent No.: US 11,593,168 B2
(45) Date of Patent: *Feb. 28, 2023

(54) ZERO COPY MESSAGE RECEPTION FOR DEVICES VIA PAGE TABLES USED TO ACCESS RECEIVING BUFFERS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/453,576

(22) Filed: Jun. 26, 2019

(65) Prior Publication Data

US 2020/0409759 A1 Dec. 31, 2020

(51) Int. Cl.
*G06F 9/50* (2006.01)
*G06F 9/455* (2018.01)

(52) U.S. Cl.
CPC ........ *G06F 9/5016* (2013.01); *G06F 9/45558* (2013.01); *G06F 9/5022* (2013.01);
(Continued)

(58) Field of Classification Search
CPC .. G06F 9/5016; G06F 9/5022; G06F 9/45558; G06F 2209/503; G06F 2009/45583; G06F 2009/45595; G06F 3/0604; G06F 3/0646; G06F 3/067; G06F 12/1009
See application file for complete search history.

(56) References Cited

U.S. PATENT DOCUMENTS 7,552,298 B2   6/2009 Bestler
9,502,139 B1 * 11/2016 Cheriton ............. G06F 11/1469
(Continued)

FOREIGN PATENT DOCUMENTS

WO   WO-2017166205 A1 * 10/2017 ......... G06F 9/45558
WO      2018112829 A1   6/2018

OTHER PUBLICATIONS

Jinho Hwang, et al., "NetVM: High Performance and Flexible Networking Using Virtualization on Commodity Platforms," Apr. 2-4, 2014, 15 pages, https://www.usenix.org/system/files/conference/nsdi14/nsdi14-paper-hwang.pdf [retrieved on Apr. 2, 2019].
(Continued)

*Primary Examiner* — Meng Ai T An
*Assistant Examiner* — Hsing Chun Lin
(74) *Attorney, Agent, or Firm* — K&L Gates LLP

(57) ABSTRACT

Zero copy message reception for devices is disclosed. For example, a host has a memory, a processor, a supervisor, and a device with access to device memory addresses mapped in a device page table via an IOMMU. An application has access to application memory addresses and is configured to identify a first page of memory addressed by an application memory address to share with the device as a receiving buffer to store data received by the device for the application, where the first page is mapped to a first device memory address in a first device page table entry (PTE). A supervisor is configured to detect that the first application has disconnected from the device, and in response to detecting the application disconnecting, to update the first device PTE to address a second page instead of the first page.

20 Claims, 9 Drawing Sheets

(52) U.S. Cl.
CPC .............. *G06F 2009/45583* (2013.01); *G06F 2209/503* (2013.01)

(56) References Cited

U.S. PATENT DOCUMENTS

| | | | |
|---|---|---|---|
| 9,575,796 B2* | 2/2017 | Tsirkin | G06F 9/45558 |
| 9,632,901 B2 | 4/2017 | Raikin et al. | |
| 9,710,393 B2* | 7/2017 | Lemay | G06F 9/45558 |
| 9,734,096 B2 | 8/2017 | Lee et al. | |
| 10,191,760 B2* | 1/2019 | Kitano | H04L 67/28 |
| 2006/0090023 A1* | 4/2006 | Olsen | H04L 63/108 |
| | | | 710/107 |
| 2007/0162619 A1* | 7/2007 | Aloni | G06F 9/45558 |
| | | | 709/250 |
| 2011/0072430 A1* | 3/2011 | Mani | G06F 11/1441 |
| | | | 718/1 |
| 2015/0293776 A1* | 10/2015 | Persson | G06F 9/5016 |
| | | | 718/1 |
| 2018/0150327 A1* | 5/2018 | Tsirkin | G06F 9/45558 |
| 2018/0232320 A1* | 8/2018 | Raval | G06F 12/1491 |
| 2018/0239715 A1 | 8/2018 | Tsirkin et al. | |

OTHER PUBLICATIONS

Jasper Dangaard Brauer, "Prototype Kernel Documentation," Nov. 22, 2018, 57 pages, https://media.readthedocs.org/pdf/prototype-kernel/latest/prototype-kernel.pdf [retrieved on Apr. 2, 2019].

\* cited by examiner ized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform more complex functions than the respective guests are capable of performing individually. To interact with a broader set of users and a broader computing ecosystem, guests typically employ virtualized devices such as input/output ("I/O") devices controlled by drivers, including virtualized network interfaces. These interactions are typically in the form of messages transmitted from one computing device (e.g., a physical host or a virtual guest) that are received by another computing device.

ZERO COPY MESSAGE RECEPTION FOR DEVICES VIA PAGE TABLES USED TO ACCESS RECEIVING BUFFERS

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform more complex functions than the respective guests are capable of performing individually. To interact with a broader set of users and a broader computing ecosystem, guests typically employ virtualized devices such as input/output ("I/O") devices controlled by drivers, including virtualized network interfaces. These interactions are typically in the form of messages transmitted from one computing device (e.g., a physical host or a virtual guest) that are received by another computing device.

SUMMARY

The present disclosure provides a new and innovative system, methods and apparatus for zero copy message reception for devices. In an example, a host has a memory, a processor, a supervisor, and a device with access to a plurality of device memory addresses via an input output memory management unit (IOMMU), where the plurality of device memory addresses are mapped in a device page table. A first application has access to a first plurality of application memory addresses (AMA), and the first application is configured to execute on the processor to identify a first page of memory addressed by an AMA of the first plurality of AMA to share with the device as a first receiving buffer to store data received by the device for the first application, where the first page is mapped as a first device memory address of the plurality of device memory addresses in a first device page table entry (PTE). A supervisor is configured to execute on the processor to detect that the first application has disconnected from the device, and in response to detecting the application disconnecting, to update the first device PTE to address a second page instead of the first page.

Additional features and advantages of the disclosed method and apparatus are described in, and will be apparent from, the following Detailed Description and the Figures.

DETAILED DESCRIPTION OF EXAMPLE EMBODIMENTS

Figure 1:
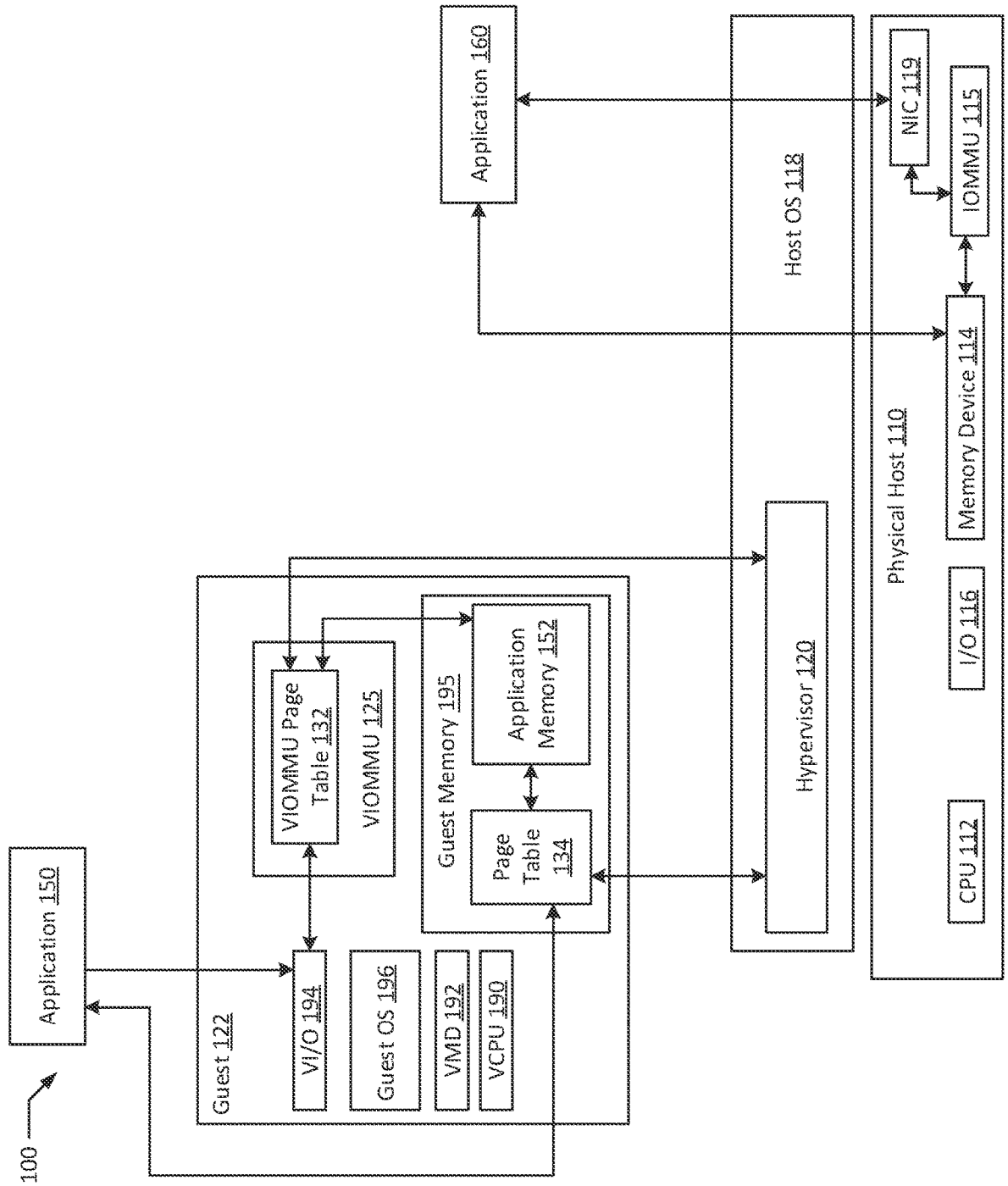
FIG. 1 is a block diagram of a system implementing zero copy message reception for devices according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). Such access is typically restricted through a virtualization manager such as a hypervisor to ensure that virtual environments remain segregated and to prevent unauthorized access to other virtual environments on the same host, or to the host itself. When physical or virtual computer systems or computing devices (e.g., storage devices, networking devices, etc.) communicate with each other, a message is typically sent from one computer system to another. This message is typically copied multiple times. For example, a first copy of the message is created and saved to memory by an application in the application's memory address space. The message may then be copied to a supervisor's memory space (e.g., an operating system), where the supervisor has a driver controlling access to a communication device. This second copy may typically require a context switch to higher access privileges controlled by the supervisor. In a virtual system, a guest supervisor may lack direct access to physical devices, requiring another copy of the data to the memory space of a higher level supervisor (e.g., a hypervisor), with access to physical computing devices. An additional copy of data may be made into device memory accessible to the computing device. When a destination system receives the message, these copies may be made in reverse order in order for a destination application to access the data. For example, a device receives the message in a receiving buffer in device memory, the contents of which are copied to hypervisor memory on the destination host, which is then copied into a guest operating system receiving buffer of a virtual device, and then finally copied into application memory of the destination application executing on the guest.

Making each of these copies made typically requires CPU processing cycles. In many modern computer systems, networking bandwidth and throughput often exceeds the copy rate of data from one area of memory to another, causing the copying steps to become a bottleneck in networking throughput. Therefore, eliminating any of the additional copying steps in the process flow described above may result in significant latency enhancements, as well as memory consumption benefits. An operation that requires data to be copied may be converted into an operation that does not require copying, and the operation that does not require copying is typically referred to as a zero copy operation. In data transmission, zero copy may be achieved by providing supervisors and/or devices with direct memory access (DMA) to the part of an application's memory space reserved as a transmission buffer. This works because the system always knows when it is sending out data, the size and contents of the data that it intends to send out, and the intended recipient of such data. However, zero copy receiving is more problematic because the size of the message received as well as the intended recipient may not be immediately available to the receiving computer system. In addition, while a system always knows when it will send a message, the system has a lot less control over when a message is received. Various solutions have been attempted. For example, one option is to map the memory addresses of device receiving buffers to the address space of the message's intended recipient (e.g., guest supervisor or application) after the message is received. Such page mapping typically results in significant processing overhead (e.g., due to requiring CPU cache flushes) which causes the latency advantages of such zero copy systems to be minimal, if any. These mappings also tend to be temporary, as the receiving buffers may typically need to be reused for other applications with different security contexts, so access may need to be removed between messages. Alternatively, assigning a portion of the receiving application's memory to the device hardware as a receiving buffer offers some performance advantages, but results in the application being unable to reclaim that memory (e.g., to disconnect from the device) without resetting the hardware device and the hardware device's memory space, which is typically not an option in shared hardware computer systems implementing virtualization. The application is typically unable to reclaim the memory shared with the device because a hardware device's memory buffers are typically restricted from being reclaimed without resetting the device unless the memory buffers are filled. Since computer systems typically lack control over when data is received, the computer system would be unable to control when memory buffers shared between applications and devices are filled and reclaimable.

The present disclosure provides for zero copy message reception by eliminating copying of data between a receiving device and a receiving application, resulting in faster message transmission for storage and networking devices. In an example, an application requesting zero copy message reception allocates a portion of its memory as a receiving buffer. The receiving buffer may be configured to be accessible by a device via a device memory address. In some examples, a device implemented with elevated rights may have access to large portions of the application's memory space. The device is configured to utilize the shared receiving buffer for any messages targeting the application. If the application disconnects from the device (e.g., the application sends a command to end a communication session, the application is terminated, the application fails to respond during a given timeout period, etc.), a supervisor controlling both the application and device (e.g., a host hypervisor, host OS) may be configured to disassociate the shared receiving buffer between the application and the device to recover computing resources (e.g., memory, networking bandwidth). For example, the supervisor may be configured to update a device page table used by the device to translate virtual device memory addresses into host memory addresses. By updating the device memory address associated with the shared memory receiving buffer to point to another page or block of physical memory as a temporary receiving buffer, the application still retains access to the original shared memory receiving buffer, while the device will store new data directed to the disconnected application in the new temporary receiving buffer. By separating the application's copy of the shared receiving buffer from the device's temporary receiving buffer, each of these receiving buffers may be reclaimed when their tasks are complete. For example, after the application processes the data from the shared memory buffer, the shared memory buffer may be reclaimed and reused. Similarly, the device's new temporary receiving buffer may be reclaimed if unused (e.g., based on a timeout expiring). The device's temporary receiving buffer may cache messages for the application for a set time period while waiting for the application to reconnect, especially where the application does not affirmatively send a request to disconnect. In an example where device receiving buffers are configured to be automatically reclaimable when full, data received for the application after disconnection, or alternatively, substituted data sent to the device (e.g., based on instructions from the supervisor) may be utilized to fill the temporary receiving buffer. In an example, the temporary receiving buffer may store data for a second application that is then copied to the second application's receiving buffer, and the temporary receiving buffer may be reclaimed after being filled with data for the second application. By enabling a supervisor to seamlessly dissociate an application and a device from their shared memory buffer, application memory usage is not constrained by device memory usage, and therefore the application may freely reuse its memory, including portions of the application's memory previously shared with a device. This flexibility is enabled because the supervisor managing memory usage for both the application and device is configured to release the device from the shared receiving buffer by remapping the virtual memory address used by the device to address the shared receiving buffer to a new, unused physical (e.g., guest physical or host physical) memory location. Therefore, at the cost of some of the memory savings of a purely zero copy system (e.g., due to double memory usage for a transient period of time upon an application disconnecting from a device), the throughput and latency advantages of zero copy reception may generally be achieved.

FIG. 1 is a block diagram of a system implementing zero copy message reception for applications according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data (e.g., storage devices, network devices, keyboards, mice, monitors, etc.). For example, a network interface card (e.g., NIC 119) may be an example of an I/O device through which physical host 110 and guests 122 and/or 124 hosted on physical host 110 communicates with external systems over a network. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI). In an example, an IO memory management unit ("IOMMU") 115 may manage memory access to system memory from an I/O device (e.g. NIC 119). In an example, an IOMMU (e.g., IOMMU 115) may provide virtual memory address translation to physical memory addresses for the I/O device (e.g., NIC 119). For example, NIC 119 may address memory in memory device 114 via virtual device addresses mapped to physical memory locations in memory device 114.

In an example, physical host 110 may host one or more guests, for example, guest 122. In an example guests may be VMs and/or containers, which may host additional nested layers of guests. In an example, guest 122 is an application executing on host OS 118 and hypervisor 120. In an example application 150 may be another virtual guest nested inside of guest 122. Application 150 may be any form of executable program that executes on guest 122. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on physical host 110. In an example, an executable program (e.g., application 150) executes on VM 122, which may be another guest (e.g. a container or VM). In addition, containers and/or VMs may further host other guests necessary to execute their configured roles (e.g., a nested hypervisor or nested containers). For example, a VM (e.g., guest 122) and/or a container may further host a Java® Virtual Machine ("JVM") if execution of Java® code is necessary.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executing on physical host 110. In another example, the hypervisor 120 may be provided by an application running on host operating system 118. In an example, hypervisor 120 may run directly on physical host 110 without an operating system beneath hypervisor 120. Hypervisor 120 may virtualize the physical layer, including processors, memory, and I/O devices, and present this virtualization to guest 122 as devices, including virtual central processing unit ("VCPU") 190, virtual memory devices ("VIVID") 192, virtual input/output ("VI/O") device 194, and/or guest memory 195. In an example, VI/O 194 may be a virtual device whose memory space is managed by a virtual IOMMU 125 via one or more VIOMMU page tables (e.g., VIOMMU page table 132). In an example, VIOMMU page table 132 and/or VIOMMU 125 may be managed by a guest supervisor of guest 122 (e.g., guest OS 196), for example, through a driver. In an example, VI/O 194 may be a virtual network interface through which guest 122 communicates with external computing resources (e.g., physical host 110, and other hosts or guests over a network). In an example, a physical I/O device (e.g., I/O 116, NIC 119) may be virtualized to provide the functionality of the physical device to a virtual guest. In an example, hypervisor 120 may host VIOMMU 125 to manage memory access for VI/O 194. In an example, VIOMMU 125 may execute independently, as part of host OS 118, as part of hypervisor 120, or within a virtualized guest (e.g., guest 122). In an example, a guest 122 may be a virtual machine and may execute a guest operating system 196 which may utilize the underlying VCPU 190, VIVID 192, and VI/O 194. Processor virtualization may be implemented by the hypervisor 120 scheduling time slots on physical processors 112 such that from the guest operating system's perspective those time slots are scheduled on a virtual processor 190.

In typical computer systems, there may be more data referenced by executing applications (both applications executing on physical hardware and those in virtualized guests on the physical hardware) than there is memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications (e.g., guest 122, application 150, VIOMMU 125, etc.). A given memory address may be referenced by any number of virtual addresses. Page tables (e.g., page table 134, VIOMMU page table 132) that perform lookups to translate between virtual and memory addresses may be implemented with granular access controls, such that a given execution context may access only those memory locations that it has permission to access based on those memory locations being available for translation in a corresponding page table.

Guest 122 may run on any type of dependent, independent, compatible, and/or incompatible applications on the underlying hardware and host operating system 118. In an example, a container or application (e.g., application 150) running on guest 122 may be dependent on the underlying hardware and/or host operating system 118. In another example, a container or application (e.g., application 150) running on guest 122 may be independent of the underlying hardware and/or host operating system 118. In an example, a container or application (e.g., application 150) running on guest 122 may be compatible with the underlying hardware and/or host operating system 118. Additionally, a container or application (e.g., application 150) running on guests 122 and 124 may be incompatible with the underlying hardware and/or OS. The hypervisor 120 may manage memory for the host operating system 118 as well as memory allocated to the guest 122 and guest operating system 196 such as guest memory 195 provided to guest OS 196.

In an example, application 160 is another executable program that executes directly on host OS 118, with access to network interface card (NIC) 119 as well as memory device 114. In an example, application 160 may be a virtual guest (e.g., a container or VM). In another example, application 160 may be any form of network accessible application that receives messages over a network. In an example, application 160's access to a network is controlled by host OS 118 (e.g., by a network driver associated with NIC 119 executing in host OS 118).

In an example, any form of suitable network for enabling communications between computing devices, for example, a public network (e.g., the Internet), a private network (e.g., a local area network (LAN) or wide area network (WAN)), or a combination thereof may be employed to connect physical host 110, guest 122, application 150 and/or 160, and/or to other computer systems. In an example, NIC 119 provides an interface between one or more of physical host 110, application 150 or 160, guest 122, and a network. In various examples, an IOMMU (e.g., IOMMU 115, VIOMMU 125) may be a physical hardware component, a software component, or a combination of both hardware and software. In an example, one or more page tables (e.g., VIOMMU page table 132, page table 134) may provide translation for virtual addresses (e.g., via page table entries) to physical memory addresses in memory device 114. In the example, VIOMMU 125 and/or hypervisor 120 may provide an interface between VIOMMU page table 132 and memory device 114. In an example, VIOMMU 125 and/or hypervisor 120 may further provide an interface between virtual memory devices (e.g., guest memory 195, VIVID 192) and memory device 114. In an example, memory device 114 may be implemented with a translation lookaside buffer (TLB), that stores recent translations of virtual memory addresses to physical memory addresses that is queried prior to querying a page table for a given translation. In an example, a TLB cache may be a physical or virtual component caching recent translation results that may be quickly accessed by CPU 112, and lookups from a TLB cache may be significantly faster than page table lookups. In an example, a context switch between an unprivileged account (e.g., an account executing application 150 or 160) and a privileged account (e.g., hypervisor 120, host OS 118) may require flushing CPU caches such as TLB caches for security purposes. In such examples, avoiding a context switch (e.g., via a zero copy operation) may significantly increase processing throughput.

In an example, VI/O 194 is allocated a section of memory as device memory, and this section of memory is also virtualized in guest memory 195. In the device memory, guest OS 196, VI/O 194, and/or a driver of VI/O 194 allocates certain memory addresses related to queueing messages for transmission, and other memory addresses for queueing messages received. These memory addresses are addressed via IO virtual addresses ("IOVAs") translated by VIOMMU page table 132 into guest memory addresses of guest 122. In an example, a hypervisor page table may be used to translate guest memory addresses into host memory addresses of physical host 110 in memory device 114. In certain examples (e.g., with a paravirtualized VI/O 194), VI/O 194 may be granted access to an extensive portion of guest memory 195A via VIOMMU page table 132. For example, VI/O 194 may be an integral part of a component with elevated access rights (e.g., guest OS 196). In the example, VI/O 194 may be granted access to all of guest memory 195A, or all or significantly all portions of guest memory 195A allocated to unprivileged applications (e.g., application 150). This enables VI/O 194 to directly access any memory location identified by an application as a shared memory buffer without further permissioning.

In an example, application 150 may be provided access to the same host memory address allocated as a receiving queue or buffer for VI/O 194. For example, application 150 may address the same physical block of memory with a different guest memory address translated via page table 134. In the example, application 150 is provided with access to a range of guest memory addresses (e.g., application memory 152), with access managed via page table 134 used to address separate blocks or pages of memory in application memory 152. In an example, by having application 150 designate a portion of application memory 152 as a receiving buffer for messages targeted at application 150, and sharing access (e.g., via hypervisor 120) to the memory addressed by such receiving buffer to VI/O 194, both application 150 and VI/O 194 may directly access the same memory locations. In the example where VI/O 194 is granted elevated access, any application memory address, once translated into a host memory address of a memory location in memory device 114, will have a corresponding device memory address in VIOMMU page table 132 and further permissioning may not be required for VI/O 194 to set the identified memory location as a shared receiving buffer with application 150. In an example, application 150 may address the shared memory locations via page table entries and virtual addresses in page table 134, while VI/O 194 may address the shared memory locations via IOVAs translated via VIOMMU page table 132. In an example, a supervisor, (e.g., hypervisor 120, host OS 118) may grant direct memory access for VI/O 194 and/or guest OS 196 to the host memory addresses addressed by the application via guest virtual addresses translated with page table 134. In an example, VI/O 194 may address memory via guest OS 196 (e.g., via page tables of guest 122) without an IOMMU (e.g., VIOMMU 125). In the example, guest 122 may be implemented with a VI/O 194 that is configured to appear to be an external communication device to guest OS 196, used by application 150 to send and receive messages to and from outside guest 122.

In an example, application 160 may similarly address a block of application memory on memory device 114 via virtual memory addresses of physical host 110. In the example, NIC 119 may also access memory locations in memory device 114 via virtual memory addresses accessible to NIC 119 (e.g., via IOMMU 115 and a corresponding IOMMU page table). In an example, application 160 may designate a range of application 160's virtual memory addresses as a receiving buffer for messages received by NIC 119 that are targeted to application 160. Host OS 118 may coordinate the sharing of this receiving buffer between application 160 and NIC 119, each of which may address the memory locations of the receiving buffer with its own set of virtual addresses.

FIGS. 2A-D are block diagrams illustrating a device providing zero copy message reception for applications on a host according to an example of the present disclosure. In the illustrated example, application 150 is configured for zero copy message reception from a device (e.g., VI/O 194). In the illustrated example, VI/O 194 addresses memory via IOVAs (e.g., IOVA 231A, 232A) translated by a VIOMMU page table 132. In an example, system 200 illustrates application 150 being configured to receive messages via VI/O 194. In various examples of system 200, addresses represented with the same number and different letters are representations of the same address as they appear to different components of system 100 (e.g., guest 122, application 150, VI/O 194, physical host 110). For example, IOVA 231A is IOVA 231B, IOVA 232A is IOVA 232B, guest physical address ("GPA") 251A is the same as GPAs 251B-D, GPA 252A is the same as GPAs 252B-D, GPA 253B is the same as GPAs 253C-D, GPA 253D is the same as GPAs 253C-D, host physical address ("HPA") 271A is HPA 271B, HPA 272A is HPA 272B, HPA 273A is HPA 273B, HPA 274A is HPA 274B, guest virtual address ("GVA") 221A is GVA 221B, GVA 222A is GVA 222B, etc. In an example, application 150 has access to application memory 152, which includes memory locations mapped as GVAs 221A and 222A. These GVAs (e.g., represented as GVA 221B and 222B) are translated by page table 134 as GPAs 251A and 252A which are memory addresses in guest memory 195 (e.g., GPA 251B and 252B). In an example, the GPAs may additionally be translated into HPAs (e.g., HPAs 271A and 272A) via hypervisor page table 210, with HPAs 271A and 272A addressing memory locations on memory device 114 (e.g., HPA 271B and 272B).

In an example, application 150 requests to initiate zero copy message reception with VI/O 194, identifying GVAs 221A and 222A as a designated receiving buffer. In the example, a supervisor (e.g., hypervisor 120), identifies that GVAs 221A and 222A correspond to GPAs 251B and 252B and assigns GPAs 251B and 252B as receiving buffer 290A to be shared between application 150 and VI/O 194. In the example, these memory addresses (e.g., GPA 251B and 252B) are already accessible to VI/O 194 as device memory addresses mapped to IOVAs 231B and 232B respectively. In the example, VI/O 194 is configured to have access to each memory address mapped to VIOMMU page table 132 (e.g., GPAs 251C, 252C, 253C, and 254C). VI/O 194 has access to GPAs 251B and 252B via IOVAs 231A and 232A. VI/O 194 is then configured to store messages received that are targeted at application 150 to the shared receiving buffer addressed by VI/O 194 as IOVAs 231A and 232A, and by application 150 as GVAs 221A and 222A. For example, application 150 may have its own IP address and/or MAC address assigned for receiving messages, allowing VI/O 194 to store the appropriate messages to the shared receiving buffer with application 150 (e.g., where application 150 is a virtual guest). In an example, these messages are ultimately stored in HPA 271B and 272B on memory device 114. Therefore, in system 200, application 150 gains the advantage of sharing a copy of data with VI/O 194 for zero copy reception, which may typically improve reception latency by 15-20%. In a typical example, sharing access to a shared memory receiving buffer may incur similar processing latency to mapping a new virtual address. However, in examples where a device is granted elevated access, and already has access to the application's memory address space, additional mapping is not required.

Figure 2A:
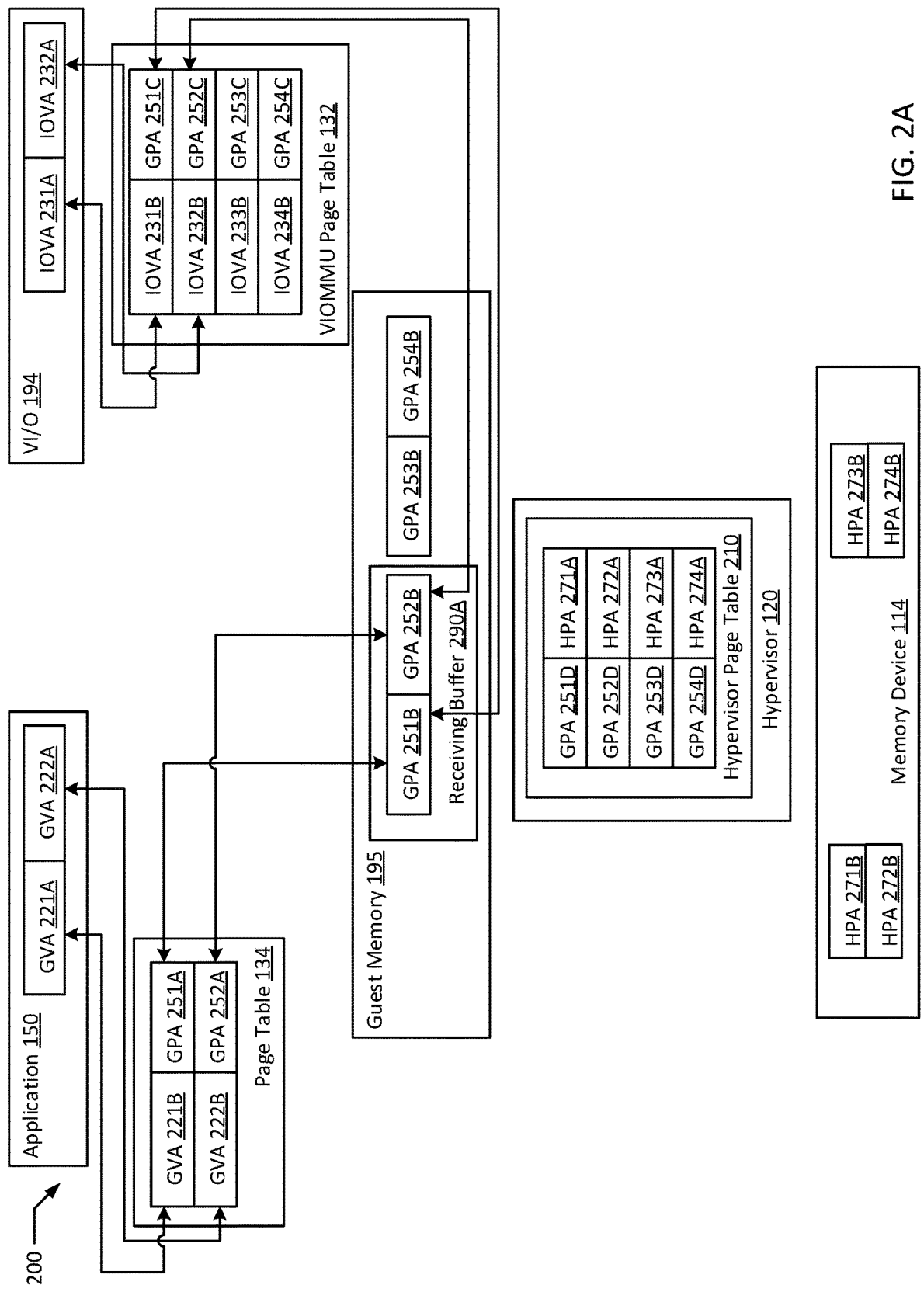
FIGS. 2A-D are block diagrams illustrating a device providing zero copy message reception for applications on a host according to an example of the present disclosure.
Figure 2B:
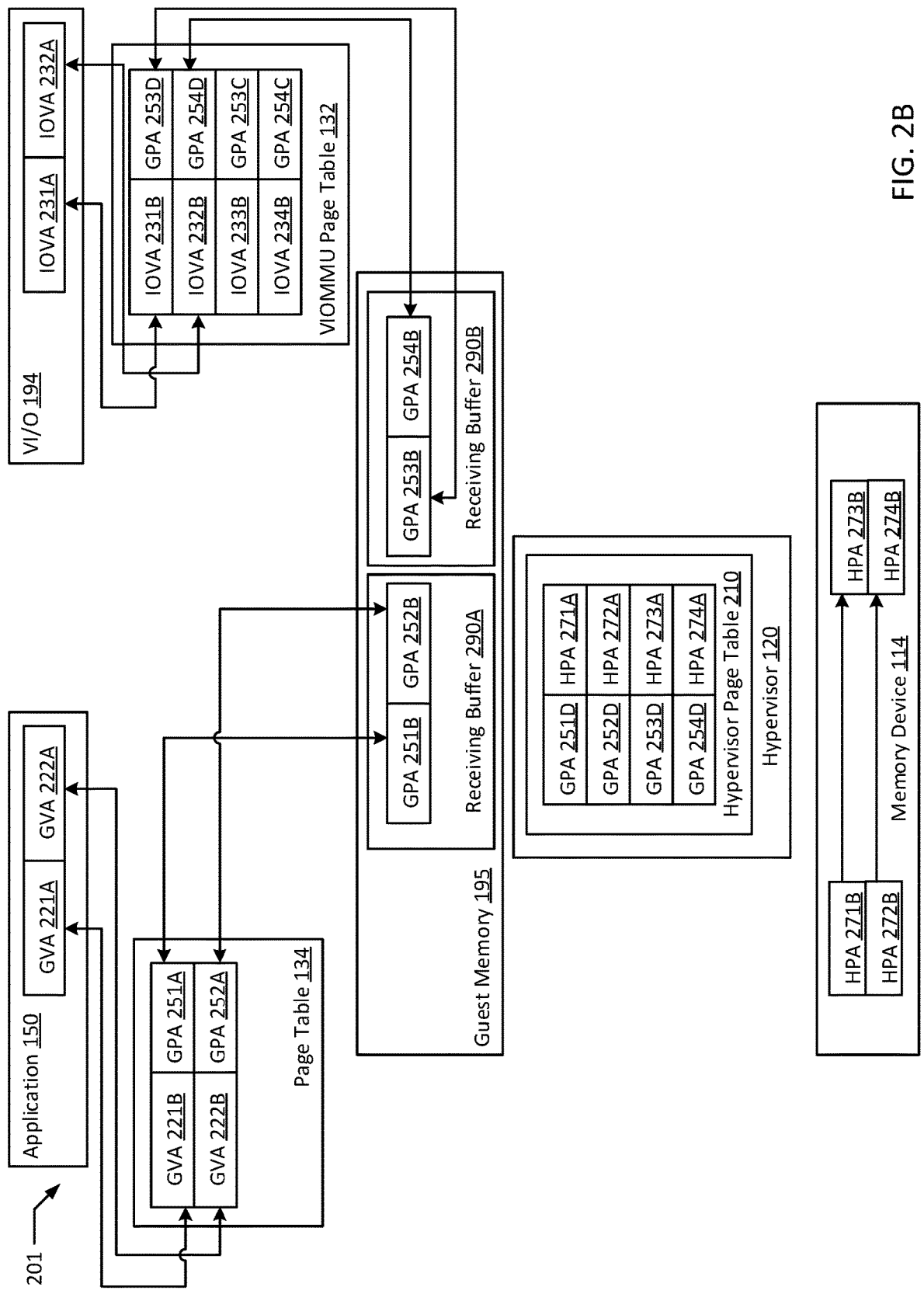

Illustrated system 201 in FIG. 2B is a later point in time for system 200, after application 150 disconnects from VI/O 194 (e.g., application 150's networking session is terminated). In various examples, application 150 may disconnect from VI/O 194 for any reason, whether or not an explicit disconnection request is received. For example, a supervisor (e.g., guest OS 196 or hypervisor 120) may determine that application 150 disconnected based on application 150 becoming unresponsive or terminating, or based on application 150 requesting to end its current networking session. For example, application 150's networking session may time out after a configured timeout. In an example where application 150 becomes unresponsive or crashes resulting in the disconnection, a renewed instance of application 150 may be launched with a recovered execution state of application 150 and resume execution of the crashed instance of application 150. In an example, application 150 requests (e.g., to guest OS 196) to disconnect from VI/O 194, but application 150 will continue to execute. In the example, application 150 sends a system call or hypercall to disconnect from VI/O 194. It should be appreciated that references to a disconnection command herein are also intended to be applicable to a passively detected disconnection. In an example, GPAs 251B and 252B are not currently full, and are allocated as device memory to VI/O 194 and actively accessed by VI/O 194. Therefore, in the example, VI/O 194 may not be able to be disassociated from GPAs 251B and 252B without resetting the device memory space of VI/O 194, which would potentially disrupt other applications' networking access. In the example, a supervisor (e.g., guest OS 196, hypervisor 120, and/or host OS 118) receives application 150's request to disconnect. In some examples, application 150's disconnection may trigger the supervisor to suspend execution of application 150 and/or VI/O 194. In an example, the supervisor (e.g., hypervisor 120), identifies a new segment of memory in memory device 114 equal or larger in size to HPAs 271B and 272B available for use by VI/O 194 as a substitute receiving buffer (e.g., receiving buffer 290B addressed by GPAs 253B and 254B). The current contents of HPAs 271B and 272B are then copied to corresponding HPAs 273B and 274B of GPAs 253B and 254B. The mappings of IOVA 231B and 232B in VIOMMU page table 132 are then updated to correspond to GPAs 253D and 254D instead of their previous association to GPAs 251D and 252D. After this update is made, VI/O 194 may resume execution. In an example, updating VIOMMU page table 132 to reassociate IOVAs 231A and 232A with the substituted receiving buffer 290B does not affect application 150's access to the original shared receiving buffer 290A. In an example, VI/O 194 already had access to GPAs 253D and 254D in the form of GPAs 253C and 254C mapped to IOVAs 233B and 254B, and the duplicated mapping does not create any issues since HPAs 273B and 274B are not currently in use. In an example, VIOMMU page table 132 may be configured to address more virtual memory addresses than the number of physical memory addresses available in memory device 114.

Upon resuming execution, VI/O 194 will seamlessly be granted access to substitute receiving buffer 290B, which will contain a different copy of the data from the copy still stored in receiving buffer 290A that is still accessed by application 150 via GVAs 221A and 222A. In order to allow the shared memory locations (e.g., GPAs 251B and 252B) to be reused, the space saving advantages of zero copy reception are temporarily lost by making an extra copy of data in order to fulfill disconnection requests. However, significantly more time is typically spent connected to a device to receive data than spent to reclaim shared memory buffers, so overall, memory consumption is also greatly reduced by saving on copying data from a device memory buffer into a separate application memory buffer.

Figure 2C:
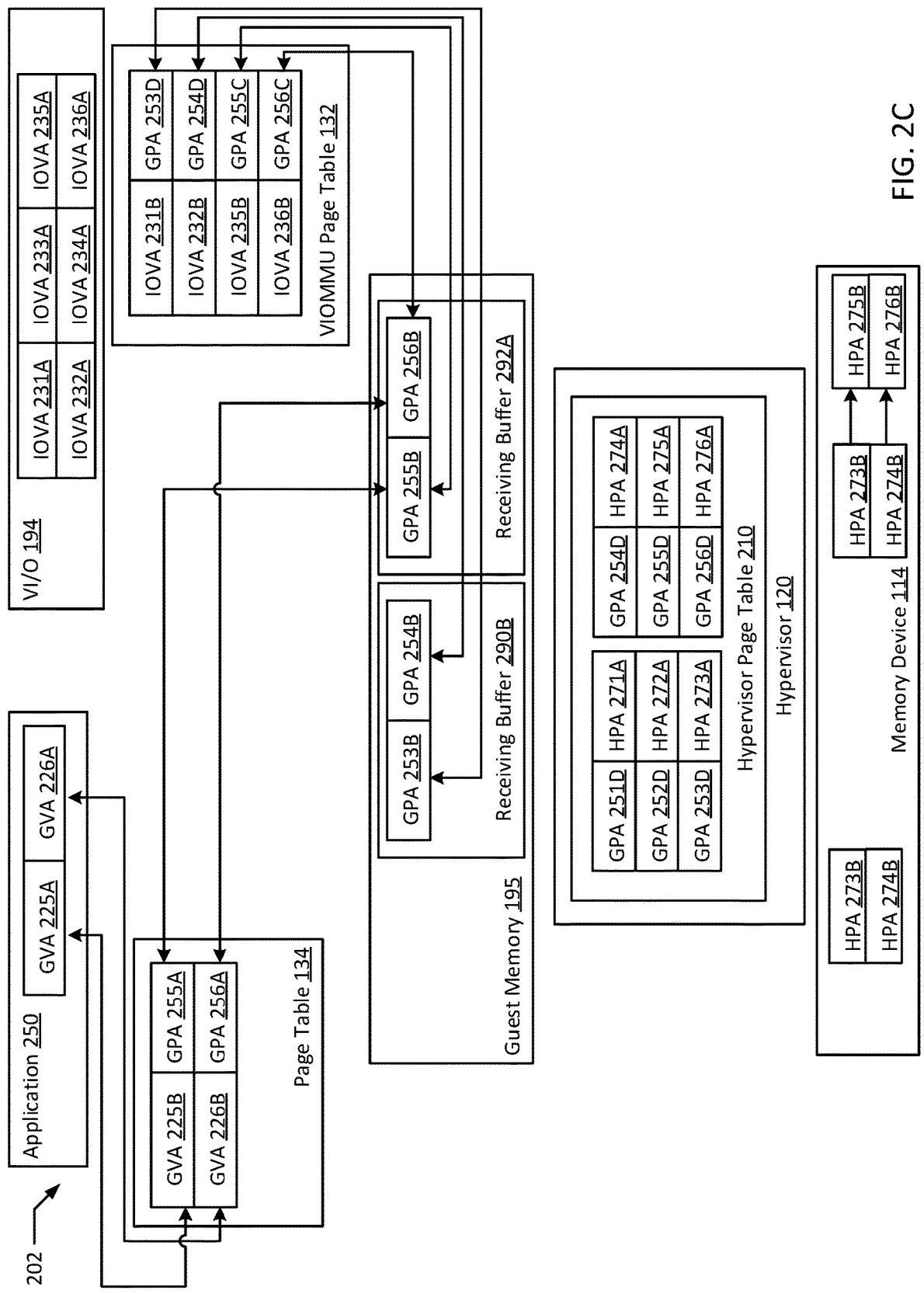

Illustrated system 202 in FIG. 2C depicts a later state of illustrated system 201. In system 202, VI/O 194 is holding on to receiving buffer 290B associated with application 150, even though application 150 has already disconnected. In an example, the receiving buffer 290B is no longer actively being used by any application, and may be flagged as a disused shared memory buffer or disused receiving buffer. In an example, VI/O 194, guest OS 196, host OS 118, and/or hypervisor 120 is configured to reclaim these buffers associated with disconnected applications after the buffers are filled as part of a memory cleanup or garbage collection process. In an example, the buffers may be filled by messages targeting application 150 received after application 150 disconnects. Alternatively, the buffers may be filled with data associated with another application (e.g., application 250). The buffers may then be reclaimed with the data inside them discarded after the buffers are filled. In an example, a disused receiving buffer is one that is no longer planned to be used by an application. However, disused receiving buffers may typically require being filled in order to allow a device (e.g., VI/O 194) to deallocate the receiving buffer, and therefore may still allow data to be written. After an application (e.g., application 150) disconnects, a distinction is that the disconnected application 150 loses access to any new data added the now disused receiving buffer that was previously shared with the device (e.g., VI/O 194), and the receiving buffer is therefore disused from the perspective of the application. In an example, VI/O 194 may be configured to have a limited number of active receiving buffers, and therefore a receiving buffer may require reclamation prior to a further receiving buffer being allocated.

In an example, application 250 is another application executing on guest 122. Application 250 has its own application memory space, which includes GVAs 225A and 226A, and application 250 requests to initialize zero copy message reception through VI/O 194, with GVAs 225A and 226A designated as a shared memory receiving buffer 292A. GVAs 225B and 226B are associated in page table entries in page table 134 with GPAs 255A and 256A which are in turn translated to VI/O 194 as GPAs 255C and 256C addressed by IOVAs 235A-B and 236A-B. In an example, GPAs 255A-D and 256A-D correspond to HPAs 275A and 276A in hypervisor page table 210.

In an example, VI/O 194 is configured to first fill any disconnected receiving buffer (e.g., GPA 253B, 254B) prior to filling any newly created receiving buffer. For example, VI/O 194 may have reached its limit of active receiving buffers and may need to reclaim receiving buffer 290B prior to being able to assign IOVAs 235A and 236A as a new shared receiving buffer with application 250. In the example, the first messages (or message fragments) received for application 250 will be stored in the remaining space in GPA 253B and/or 254B. In an example, the data thus stored may be copied by hypervisor 120 to the new receiving buffer 292A accessible to application 250. For example, the newly received data in HPA 273B and/or HPA 274B may be copied to HPA 275B and/or HPA 276B. After being filled, IOVA 231A-B and IOVA 232A-B (along with corresponding GPAs 253B-D and 253B-D, and HPAs 273A-B and 273A-B) may be reclaimed thereby reducing memory consumption, and freeing up a receiving buffer allocation for VI/O 194. In an alternative example, the first message(s) received for application 250 may be routed to GPAs 253B and/or 253B to fill the disused receiving buffers and simply discarded. In such a scenario, the message(s) (or packets of such message(s)) would likely be treated as lost due to a networking failure (e.g., as a dropped packet), and would be retransmitted and stored properly in GPA 255B and 256B upon retransmission (e.g., based on the sender failing to receive acknowledgement of receipt). For transmissions that are less latency critical, this type of initial reception delay may be preferable to context switching to supervisor mode to perform the data copy described above from the disused buffer to the new shared buffer between application 250 and VI/O 194. In an example, application 250 may be any application accessing the network, including a later execution state of application 150 reconnecting to VI/O 194. In some examples, receiving buffer 290B may be configured to be preemptively reclaimed, for example, when there is processing capacity to spare. In the example, receiving buffer 290B may be filled with data generated simply for the purpose of filling receiving buffer 290B (e.g., by guest OS 196) so that after receiving buffer 290B is filled, it may be reclaimed. In an example, artificially filling and reclaiming receiving buffer 290B may be triggered after a set timeout period indicating that application 150 is not reconnecting to VI/O 194.

Figure 2D:
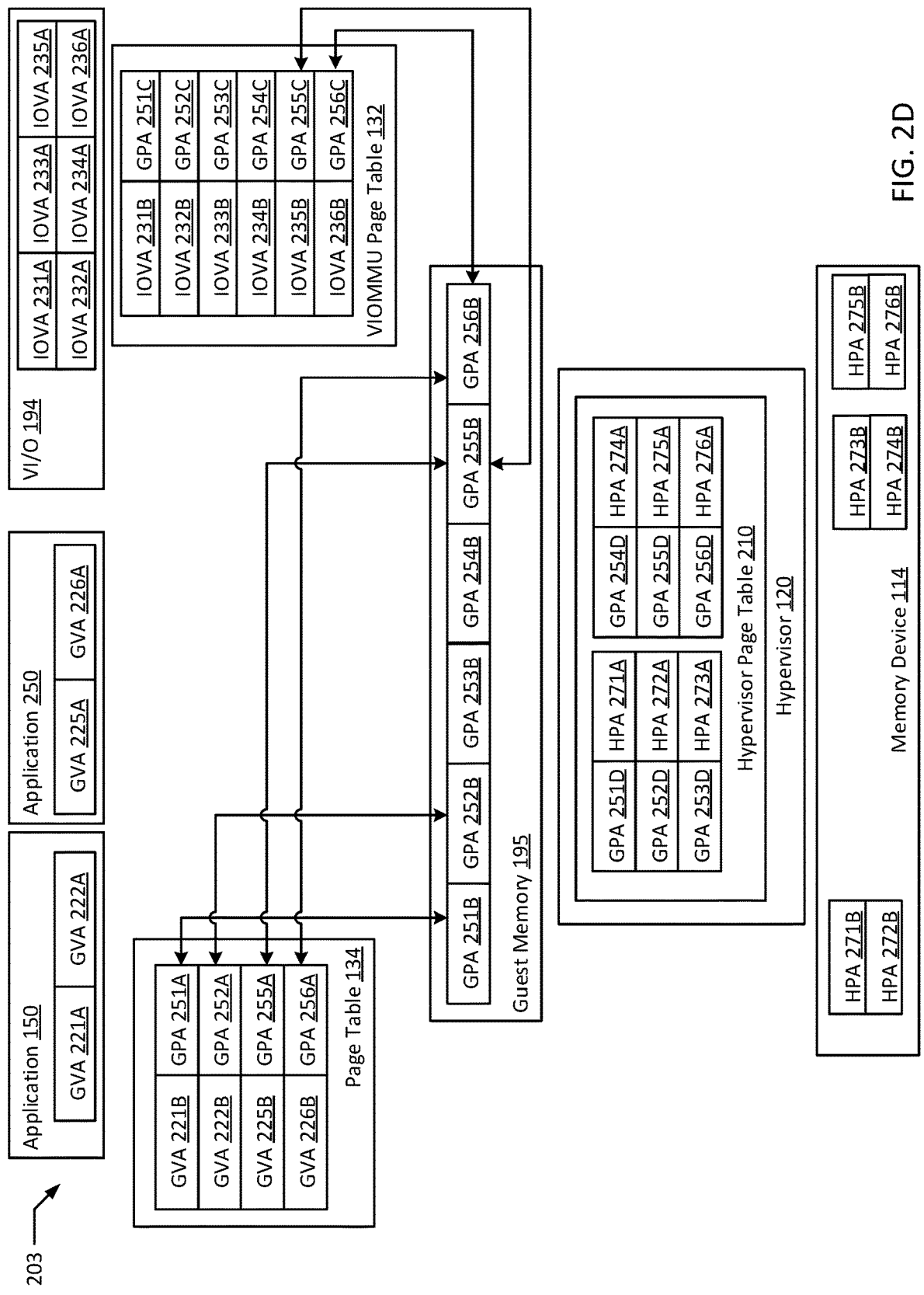

Illustrated system 203 in FIG. 2D depicts a later state of illustrated system 202, after GPAs 253A-D and 254A-D have been filled and reclaimed, and where applications 150 and 250 are different executable programs. In an example, GPAs 253A-D and 254A-D are reclaimed after being filled by VI/O 194 with data directed towards application 250. In the example, application 150 still has access to GVAs 221A and 222A and receiving buffer 290A. In the example, application 250 currently shares a shared memory receiving buffer 292A for receiving messages with VI/O 194 in the form of a segment of memory addressed by GVAs 225A-B and 226A-B, GPAs 255A-D and 256A-D, and IOVAs 235A-B and 236A-B. In the example, messages targeted for routing to application 250 are received by VI/O 194, stored in IOVAs 235A and 236A (and therefore GPAs 255A-D and 256A-D, as well as HPAs 275A-B and 276A-B), and read directly by application 250 without needing to be copied again (e.g., via GVAs 225A and 226A). In an example, each page table's (e.g., page table 134, VIOMMU page table 132, and hypervisor page table 210) page size for a page of memory need not directly match the page size in another page table, and offsets within a page of memory may be utilized to cause the various virtual addresses to refer to the same physical storage location in memory device 114. For example, hypervisor page table 210 may be implemented with 2 megabyte pages while VIOMMU page table 132 may be implemented with 32 kilobyte pages. In an example, contents of messages stored in a shared buffer by VI/O 194 (e.g., in GPA 255A-D or 256A-D) may be read, copied, or otherwise processed (e.g., as an input) by application 250, and any results of processing such data contents may be stored in a different, unshared part of application 250's memory space. In an example, after reclaiming shared memory buffer 290B, IOVAs 231B and 232B are remapped again to 251C and 252C. In the example, since IOVAs 231B and 232B are not assigned as a receiving buffer, VI/O 194 is not configured to write any additional data to GPAs 251C and 252C.

Figure 3:
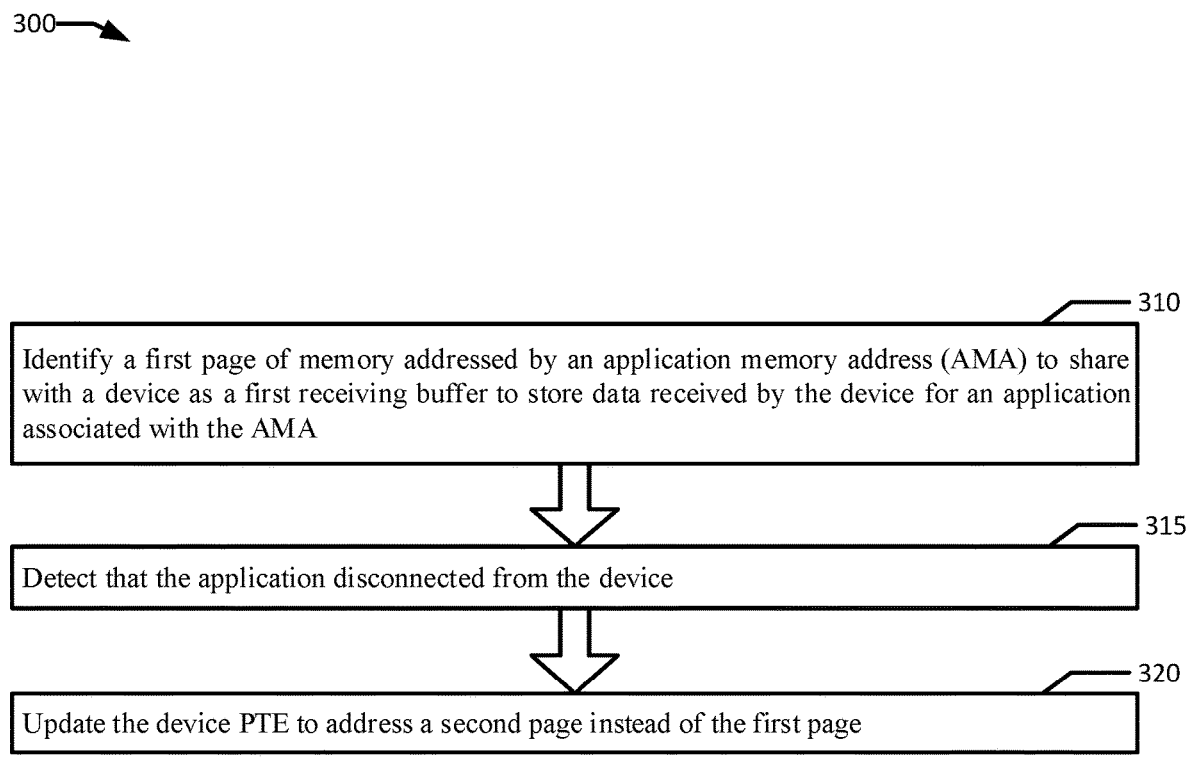
FIG. 3 is a flowchart illustrating an example of zero copy message reception for devices according to an example of the present disclosure.

FIG. 3 is a flowchart illustrating an example of zero copy message reception for applications according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by application 150 and hypervisor 120.

Example method 300 may begin with identifying a first page of memory addressed by an application memory address (AMA) to share with a device as a first receiving buffer to store data received by the device for an application associated with the AMA (block 310). In an example, the first page is mapped as a device memory address in a device page table entry (PTE) of a device page table associated with the device (e.g., VI/O 194, NIC 119, I/O 116, etc.). In an example, the application (e.g., application 150) has access to a plurality of application memory addresses (AMA) (e.g., GVA 221A, 222A) including a first AMA (e.g., GVA 221A), which is mapped to a page table entry (PTE) in a page table (e.g., page table 134) that addresses the first page (e.g., a page of memory at HPA 271B). In an example, application 150 allocates part of its application memory (e.g., addressed by GVA 221A) as a receiving buffer 290A for storing messages received by a device (e.g., VI/O 194). In an example, VI/O 194 is a network interface or a storage device. In an example, memory access for application 150 and/or VI/O 194 is managed by a supervisor, which may be any supervisor with elevated access to memory as compared to application 150 or VI/O 194 (e.g., guest OS 196, hypervisor 120, host OS 118, etc.). In an example, the receiving buffer 290A shared between application 150 and VI/O 194 (e.g., memory addressed by GVA 221A, GPA 251A, IOVA 231A) is configured as a message queue for queueing messages and message packets received by VI/O 194 for application 150. In an example, a data message may be assembled from the contents of multiple individual message packets received on the message queue. In an example, an IOMMU manages memory access to memory for devices (e.g., VI/O 194) on the system executing application 150 (e.g., guest 122). In such an example, VI/O 194 may access memory device 114 with virtual memory addresses mapped in and translated by an IOMMU page table (e.g., VIOMMU page table 132). In an example, a supervisor (e.g., hypervisor 120) may also grant a device (e.g., VI/O 194) direct access to memory addresses by mapping such memory addresses to the device's device memory space. For example, VI/O 194 may be configured to directly access contents of HPA 271B without copying the contents into VI/O 194's memory space. In an example, VI/O 194 is configured with an elevated security context compared to application 150. In such an example, VI/O 194 may have access to a larger memory space than application 150. For example, VI/O 194 may, through virtual memory addresses (e.g., IOVAs 231B, 232B, 233B, 234B, 235B) in page table entries in VIOMMU page table 132 have access to a substantial portion of or even all of application 150's memory space (e.g., application memory 152).

The application is detected as having disconnected from the device (block 315). In an example, application 150 requests to stop receiving messages from VI/O 194. In an example, sending such a request causes execution application 150 to be suspended. For example, application 150 may be configured to suspend itself after sending a system call to disconnect from a device to guest OS 196. In another example, the supervisor (e.g., hypervisor 120) may be configured to pause execution of application 150 in response to receiving such a request. In another example, a request is received to disconnect the device (e.g., VI/O 194). For example, guest OS 196 may request to reset or reinitialize VI/O 194, disconnecting all currently connected applications including application 150. In such an example, the current execution state of VI/O 194 may be preserved in memory to restore ongoing communications as soon as possible after such a reset. In various examples, any loss of communication between application 150 and VI/O 194 (e.g., application 150 crashing, timeout in an established communication session, etc.) may be interpreted by the supervisor as a disconnection between application 150 an VI/O 194.

The device page table entry is updated to address a second page instead of the first page (block 320). In an example, guest OS 196 or hypervisor 120 determines that application 150 has disconnected from VI/O 194 and issues a disconnection request to a driver of VI/O 194. In the example, hypervisor 120 may handle at least part of the disconnection request by segregating access to the shared memory receiving buffer 290A used for receiving messages for application 150. In an example, separating access is achieved by remapping the device's (e.g., VI/O 194) virtual memory addresses for the shared memory receiving buffer 290A to different underlying memory address (e.g., GPAs 253B and 254B). This allows the new receiving buffer for VI/O 194 (e.g., receiving buffer 290B) to seamlessly take over as a storage location for any further messages received by VI/O 194 after disconnection. In some examples, data currently in receiving buffer 290A may be copied to receiving buffer 290B, for example, in systems where application 150 is expected to reconnect to VI/O 194 for further zero copy message reception. In such an example, the data received by VI/O 194 post disconnection may be provided to application 150 after reconnection. In an example, receiving buffer 290B may be preferentially allocated from memory locations accessible to application 150 allowing receiving buffer 290B to be configured as a new shared memory receiving buffer between application 150 and VI/O 194 when application 150 reconnects. In an alternative example, receiving buffer 290B may be outside of application 150's memory address space (e.g., application memory 152), and inaccessible to application 150. In such an example, receiving buffer 290B may be mapped to application 150's memory space if application 150 reconnects to VI/O 194.

In an example, to make the transition from GPA 251B to GPA 253B seamless to VI/O 194, hypervisor 120 updates VIOMMU page table 132, so the page table entry corresponding to IOVA 231B is associated with GPA 253D instead of GPA 251C. This way, VI/O 194, in accessing IOVA 231A now accesses GPA 253D instead of GPA 251C. However, application 150 still accesses the previously shared memory receiving buffer at GPA 251A when application 150 accesses GVA 221A.

In an example, VI/O 194 is configured with a limited number of configurable receiving buffers (e.g., based on the number of concurrent networking sessions that can be maintained by VI/O 194). In such an example, VI/O 194 may need to reclaim a receiving buffer (e.g., receiving buffer 290B), in order to provide networking access to another application after application 150 disconnects (e.g., application 250). In an example, after application 150 disconnects from VI/O 194, hypervisor 120 may reclaim the memory addressed by GPA 253A-D and HPA 273A-B from VI/O 194. In an example, VI/O 194 may be reset or restarted to reclaim the memory for hypervisor 120. In an example, reclaiming a receiving buffer may be more efficiently accomplished as part of a garbage collection process. In such an example, such garbage collection may be restricted to full and/or empty receiving buffers. In cases where empty receiving buffers may be reclaimed, the data in receiving buffer 290B may be discarded (e.g., after a timeout for application 150 to reconnect) to expedite reclamation of receiving buffer 290B. In another example, VI/O 194 may be configured to clean up used memory after the given segment of memory (e.g., shared receiving buffer 290B) is filled. In an example, VI/O 194 may use other data (e.g., targeted at another application, or artificial data) to fill shared receiving buffer 290B.

In an example, application 150 later reconnects to VI/O 194 for zero copy message reception. In the example, application 150 may identify another memory address in application 150's address space (e.g., GVA 222A-B, GPA 232A-D) as an intended shared memory receiving buffer for its new networking session. In an example, VI/O 194 has an available receiving buffer to allocate to the reconnected application 150, and assigns the identified address as its new shared memory receiving buffer with application 150. In another example, VI/O 194 still has receiving buffer 290B assigned to application 150, and receiving buffer 290B is mapped into application 150's memory space (e.g., by hypervisor 120). In an example, receiving buffer 290B may be mapped to the guest virtual addresses identified by application 150 for its new receiving buffer, and therefore from the application's perspective, the addresses identified by application 150 were utilized for the new receiving buffer. In another example (e.g., where VI/O 194 lacks an available receiving buffer allocation slot), data from receiving buffer 290B may be copied to application 150's new receiving buffer. VI/O 194 may continue filling receiving buffer 290B and copying the data for application 150 until receiving buffer 290B is full, and then reclaim receiving buffer 290B and assign application 150's newly identified memory locations as a new shared memory receiving buffer.

In an example, after application 150 disconnects from VI/O 194, application 250 requests to utilize VI/O 194 with zero copy message reception. In the example, application 250 identifies part of its application memory as a shared receiving buffer for messages received by VI/O 194 on behalf of application 250. In an example, application 250 assigns a page of memory addressed as GVA 225A as a part of this new shared buffer, which corresponds to GPA 255A accessible to VI/O 194 as IOVA 235A. In the example, both VI/O 194 and application 250 have access to this new shared buffer allowing application 250 to read data received by VI/O 194 directly, without making an additional copy.

In an example, when application 250 (e.g., a different application or instance of an application from application 150) requests zero copy message reception, VI/O 194 has yet to fill its previous shared buffer with application 150 (e.g., a page of memory addressed by GPA 253B). In the example, GPA 253B and its corresponding addresses therefore represent wasted memory space on physical host 110 until reclaimed. In some examples, GPA 253B (and receiving buffer 290B) also represent one of VI/O 194's limited allocable receiving buffers being occupied by an unused receiving buffer. In an example, GPA 253B may be efficiently reclaimed from VI/O 194 after it is fully utilized, however, since application 150 has disconnected from VI/O 194, additional outbound messages are no longer being sent by application 150, and therefore no responses are expected to be received directed towards application 150. In an example, VI/O 194 is configured to first fill any unused buffers prior to moving on to allocating or filling new shared buffers in order to facilitate reclamation of the unused buffers. In an example, broadcast messages without a target may be utilized to fill unused buffers. In an example, messages targeted for application 250 may be utilized to fill the previously shared buffer with application 150. In such examples, any data written to the unused buffer (e.g., receiving buffer 290B) may be copied (e.g., by hypervisor 120), to the new buffer identified by application 250. In such a scenario, there would be an initial latency cost due to the copy operation to allow hypervisor 120 to reclaim the unused shared buffer (e.g., a memory page addressed by GPA 253A-D). In an example, after receiving buffer 290B is filled and reclaimed, receiving buffer 292A is then assigned as a receiving buffer of VI/O 194. Further data would be stored by VI/O 194 in the new shared buffer (e.g., GPA 255A-D) allowing zero copy access to application 250. Alternatively, data received for application 250 may also be stored in the unused shared buffer with application 150 and then discarded without copying. Discarding such message packets may then require the packets to be resent due to application 250 failing to receive the packets (e.g., triggering a networking timeout). In an example, discarding data may be more secure than allowing data to be written to a different application's buffer and then copying data by reducing the possibility of granting unintended access to such different application's data. In addition, discarding the data requires less processing by CPU 112. In an example, the behavior of hypervisor 120 may also be dictated by access credentials of application 250. For example, where application 250 is the same application as application 150 (e.g., a reconnection to VI/O 194 by application 150), access control concerns may be irrelevant and the same buffer may be reused. In examples where applications 150 and 250 have the same access rights (e.g., are executing under the same account), there may be less potential for security concerns. In a typical example, GPA 251A-D and GPA 253A-D would address memory that is outside of application 250's memory space and would therefore be memory that application 250 is restricted from accessing.

In an example, after a period of disuse, for example, where guest 122 is not transmitting messages, VIOMMU page table 132 may be swapped into slower memory (e.g., solid state drive or hard drive storage instead of DRAM) to clear room in memory device 114 for uses requiring faster memory access. In addition, page table 134 may be swapped into slower storage if application 150 is in a prolonged pause in execution (e.g., suspended) even if VI/O 194 is actively used by another application for message transmission.

Figure 4:
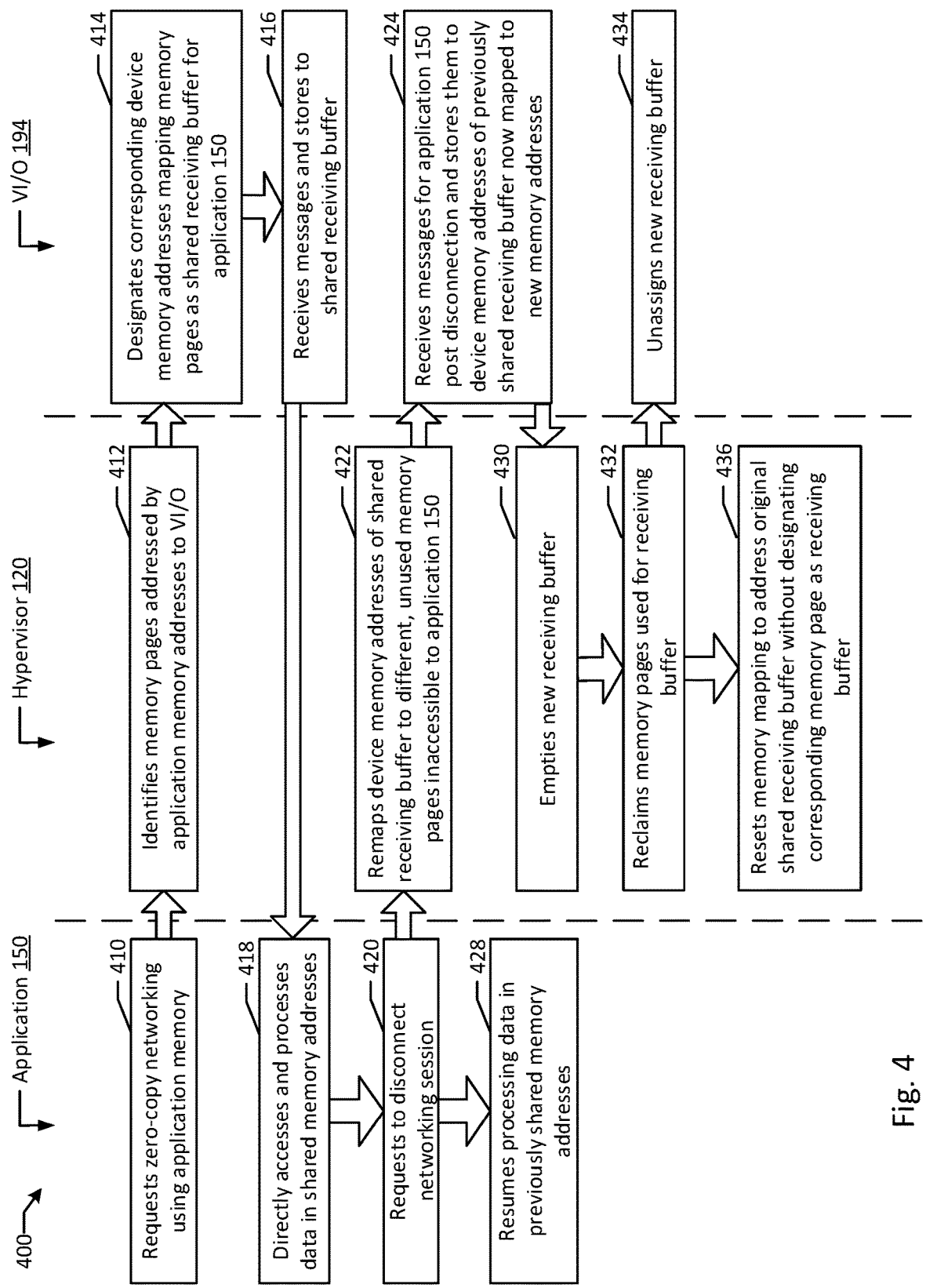
FIG. 4 is flow diagram of an example of a device providing zero copy message reception for applications on a host according to an example of the present disclosure.

FIG. 4 is flow diagram of an example of a device providing zero copy message reception for applications on a host according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, hypervisor 120, facilitates zero copy message reception through VI/O 194 for applications 150 and 250.

Application 150 initially requests zero-copy networking via VI/O 194, using part of application 150's allocated application memory as a shared receiving buffer with VI/O 194 (e.g., GVAs 221A, 222A) (block 410). In an example, hypervisor 120 identifies GPAs 251A and 252A as corresponding to GVAs 221A and 222A, and instructs VI/O 194 that application 150 has requested corresponding IOVAs 231A and 232A in VI/O 194's device memory space as a shared memory receiving buffer (block 412). VI/O 194 establishes a receiving buffer 290A using the shared application memory (e.g., IOVAs 231A, 232A, and GPAs 251C, 252C) for messages directed towards application 150 (block 414). In an example, application 150 may be a guest (e.g., container or VM) executing on guest 122 allowing VI/O 194 to easily segregate messages targeted to application 150 based on application 150's network address (e.g., IP address, MAC address). In an example, VI/O 194 receives messages for application 150 and stores them to the shared receiving buffer 290A (block 416). Application 150 then directly access the same memory locations where VI/O 194 stored the message data (e.g., via GVAs 221A and 222A mapped to the same memory locations as IOVAs 231A and 232A) (block 418). In an example, application 150 later requests to disconnect from its networking session and VI/O 194 (block 420). Hypervisor 120 remaps IOVAs 231A and 232A mapped to shared receiving buffer 290A to unused GPAs 253D and 254D which are inaccessible to application 150, effectively creating a new receiving buffer 290B (block 422). In an example, from VI/O 194's perspective, nothing has changed since VI/O 194 still accesses its receiving buffer via IOVAs 231A and 232A. For example, if hypervisor 120 additionally copies the then current contents of receiving buffer 290A when remapping IOVAs 231A and 232A, VI/O 194 may be configured to interpret receiving buffer 290B as the same receiving buffer as receiving buffer 290A. In an example, VI/O 194 continues to receive messages for application 150 after disconnection and stores these messages to receiving buffer 290B (block 424). In the meantime, application 150 resumes to access receiving buffer 290A and processes data from receiving buffer 290A (block 428). Hypervisor 120 then empties receiving buffer 290B to prepare receiving buffer 290B for reclamation (block 430). After receiving buffer 290B is emptied, hypervisor 120 reclaims the memory pages used to host receiving buffer 290B (e.g., GPAs 253D, 254D) (block 432). In an example, VI/O 194 additionally unassigns receiving buffer 290B as a receiving buffer, allowing VI/O 194 to assign another receiving buffer when necessary (block 434). In an example, hypervisor 120 resets the memory mapping of IOVAs 231B and 232B to GPAs 251C and 252C, restoring VI/O 194's access to GPAs 251C and 252C, but without designating or indicating to VI/O 194 to designate IOVAs 231A or 231B as a receiving buffer (block 436).

Figure 5:
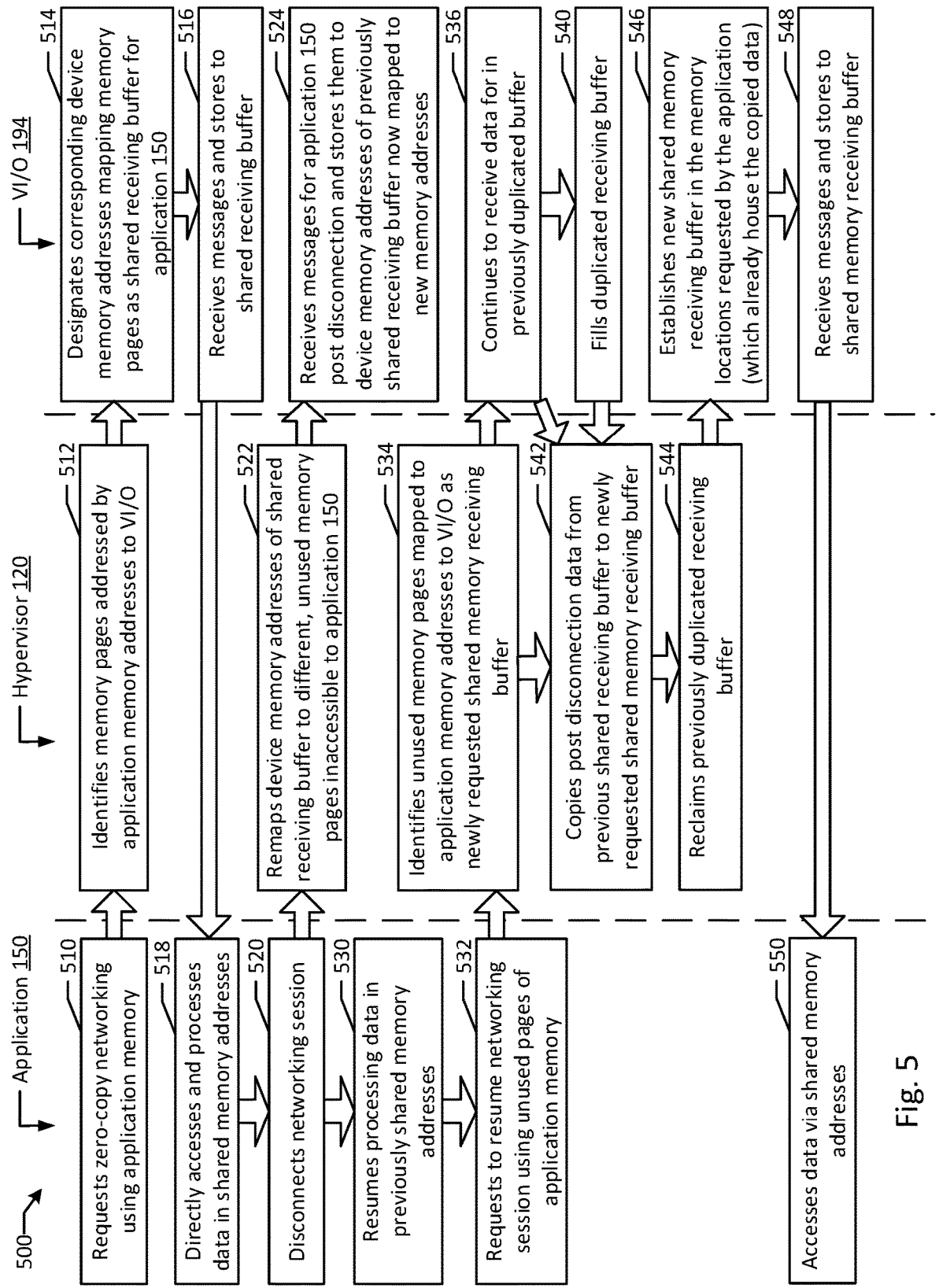
FIG. 5 is flow diagram of an example of a device providing zero copy message reception for an application that reconnects after a disconnection on a host according to an example of the present disclosure.

FIG. 5 is flow diagram of an example of a device providing zero copy message reception for an application that reconnects after a disconnection on a host according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, hypervisor 120, facilitates zero copy message reception through VI/O 194 for application 150.

Application 150 initially requests zero-copy networking via VI/O 194, using part of application 150's allocated application memory as a shared receiving buffer with VI/O 194 (e.g., GVAs 221A, 222A) (block 510). In an example, hypervisor 120 identifies GPAs 251A and 252A as corresponding to GVAs 221A and 222A, and instructs VI/O 194 that application 150 has requested corresponding IOVAs 231A and 232A in VI/O 194's device memory space as a shared memory receiving buffer (block 512). VI/O 194 designates a receiving buffer 290A using the shared application memory (e.g., IOVAs 231A, 232A, and GPAs 251C, 252C) for messages directed towards application 150 (block 414). In an example, VI/O 194 receives messages for application 150 and stores them to the shared receiving buffer 290A (block 516). Application 150 then directly access the same memory locations where VI/O 194 stored the message data (e.g., via GVAs 221A and 222A mapped to the same memory locations as IOVAs 231A and 232A) (block 518). In an example, application 150 later disconnects from its networking session and VI/O 194 (e.g., networking session times out) (block 520). Hypervisor 120 remaps IOVAs 231A and 232A mapped to shared receiving buffer 290A to unused GPAs 253D and 254D which are inaccessible to application 150, effectively creating a new receiving buffer 290B (block 522). In an example, VI/O 194 continues to receive messages for application 150 after disconnection and stores these messages to receiving buffer 290B, which is addressed via IOVAs 231A and 232A, the same device memory addresses previously associated with receiving buffer 290A (block 524). In the meantime, application 150 resumes to access receiving buffer 290A and processes data from receiving buffer 290A after the disconnection (block 530).

For purposes of the following paragraph, application 250 in FIG. 2C may be interpreted as application 150 from FIG. 2B at a later point in time, after application 150 has disconnected from VI/O 194. In an example, application 150 (now depicted as application 250) later requests to resume its networking session, and identifies unused pages of application memory (e.g., at GVAs 225A and 226A) as a new receiving buffer (e.g., receiving buffer 292A) to be shared with VI/O 194 for zero copy message reception (block 532). In an example, receiving buffer 292A needs to be designated by VI/O 194 as a receiving buffer before data is directly written to receiving buffer 292A. Hypervisor 120 identifies GPAs 255A and 256A as physical memory addresses associated with GVAs 225A and 226A, and notifies VI/O 194 of the new request for a shared memory receiving buffer (block 534). VI/O 194, in the meantime, has continued to receive data in receiving buffer 290B for application 150 (block 536). For example, VI/O 194 may have reached its configured limit on receiving buffers and may require a receiving buffer to be reclaimed prior to designating an additional receiving buffer. Hypervisor 120 copies the data from receiving buffer 290B to the addresses identified by application 150 for receiving buffer 292A as receiving buffer 290B is filled (block 542). The data being copied by hypervisor 120 is also data used by VI/O 194 to fill receiving buffer 290B (block 540). When receiving buffer 290B is filled, hypervisor 120, in conjunction with VI/O 194 reclaims previously duplicated receiving buffer 290B (block 544). VI/O 194 then establishes a new shared memory receiving buffer in the memory locations requested by application 150 (e.g., GPAs 255A-D, 256A-D), which already house the copied data from receiving buffer 290B, to the extent such data has not yet been consumed by application 150 (block 546). VI/O 194 receives additional messages and stores them to shared memory receiving buffer 292A (block 548). Application 150 then directly access the same memory locations where VI/O 194 stored the message data (e.g., via GVAs 225A and 226A mapped to the same memory locations as IOVAs 235A and 236A) (block 550).

Figure 6:
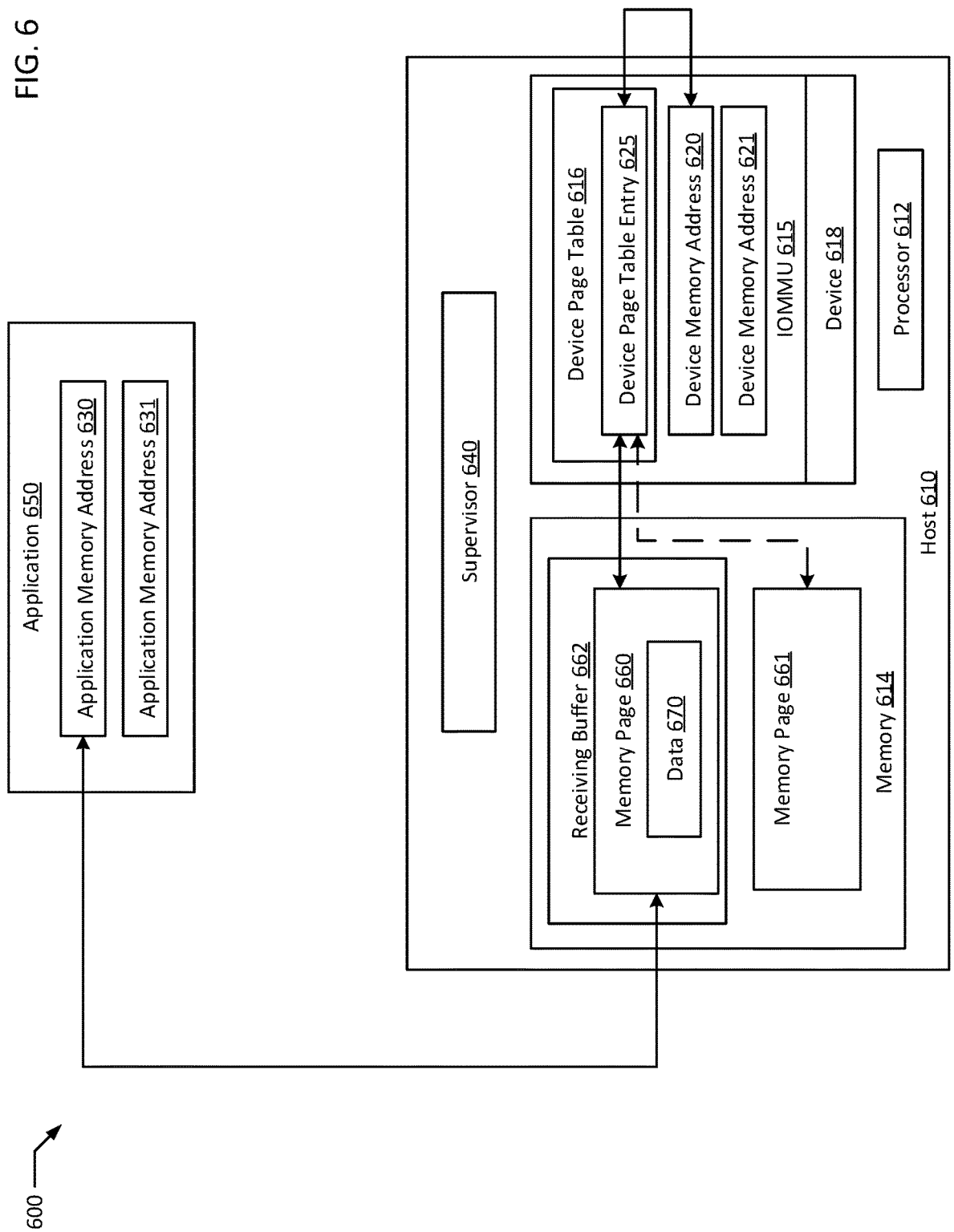
FIG. 6 is a block diagram of an example zero copy message reception system according to an example of the present disclosure.

FIG. 6 is a block diagram of an example zero copy message reception system according to an example of the present disclosure. Example system 600 includes host 610 with a memory 614, a processor 612, a supervisor 640, and a device 618 with access to device memory addresses 620 and 621 via an IOMMU 615, where the plurality of device memory addresses are mapped in a device page table 616. Application 650 has access to application memory addresses (AMA) 630 and 631. Application 650 is configured to execute on processor 612 to identify memory page 660 addressed by AMA 630 to share with the device 618 as a receiving buffer 662 to store data 670 received by device 618 for application 650, where memory page 660 is mapped to device memory address 620 in a device page table entry (PTE) 625. Supervisor 640 detects that application 650 has disconnected from device 618. In response to detecting application 650 disconnecting, supervisor 640 updates device page table entry 625 to be mapped to memory page 661 instead of memory page 660.

Zero copy message reception as described in the present disclosure enables applications to obtain the latency benefits of eliminating copying data between device memory and application memory, which also results in reduced processor usage since the processor does not need to perform a copy operation. Implementing zero copy message reception as described herein may not always result in a complete, true zero copy operation, but data copy operations are typically reserved for the start or end of a given application's session utilizing a device, and therefore zero copy memory savings are generally realized during ordinary operation of the device by the application. For example, while a transient second copy may be made in order to fill a duplicated shared memory buffer after an application disconnects to allow a device to more efficiently reclaim a receiving buffer, after the duplicated shared memory buffer is filled, in accordance with the current disclosure, the memory used can be returned to the host system and unmapped by the device. Similarly, while a newly connecting application may temporarily generate a second copy of data (e.g., where a device lacks available receiving buffers), in accordance with the current disclosure, the first copy is eliminated after the device fills the receiving buffer the device is attempting to reclaim. Therefore, zero copy message reception results in higher networking throughput and reduced processing cycles, which results in reduced networking latency, higher processing efficiency, reduced heat generation, and reduced overall memory consumption.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a host with a memory, a processor, a supervisor, a guest memory, and a device with access to a plurality of device memory addresses via an input output memory management unit (IOMMU), wherein the plurality of device memory addresses are mapped to the guest memory in a device page table; and
   a first application with access to a first plurality of application memory addresses (AMA),
   wherein the first application is configured to execute on the processor to:
      identify a first page of the guest memory that is mapped, in a page table associated with the first application, to a first AMA of the first plurality of AMA,
      wherein the first page of the guest memory is also mapped, in a first device page table entry (PTE) of the device page table, to a first device memory address of the plurality of device memory addresses; and
      communicate, in a communication session with the device, by sharing the first page with the device as a first receiving buffer in the guest memory to store first data received by the device for the first application;
   wherein the supervisor is configured to execute on the processor to:
      detect that the communication session is terminated such that the first application is disconnected from the device; and
      responsive to detecting that the first application has disconnected from the device, update the first device PTE in the device page table to map the first device memory address to a second page of the guest memory instead of the first page of the guest memory and copy the first data of the first page of the guest memory to the second page of the guest memory as an extra copy of the first data.

2. The system of claim 1, wherein the device is one of a network interface and a storage device.

3. The system of claim 1, wherein the supervisor is one of a hypervisor and a host operating system.

4. The system of claim 1, wherein the device has access to respective pages of the guest memory mapped to each of the first plurality of application memory addresses via corresponding device memory addresses of the plurality of device memory addresses that are also mapped to the respective pages.

5. The system of claim 1, wherein the first application lacks access to the second page of the guest memory.

6. The system of claim 1, wherein the first application continues to access the first page of the guest memory after the first device memory address of the first device PTE is remapped to the second page of the guest memory.

7. The system of claim 1, wherein the supervisor discards data in the second page of the guest memory and reclaims the second page of the guest memory.

8. The system of claim 1, wherein a second application, which is any application accessing a network, identifies a third page of the guest memory to share with the device to store data received by the device for the second application.

9. The system of claim 8, wherein the second application is the first application that has been reconnected to the device at a point in time after the first device memory address of the first device PTE was mapped to the second page of the guest memory.

10. The system of claim 9, wherein second data is received after the first application disconnected and before the first application reconnected with the device as the second application, and access to the second data is provided to the first application.

11. The system of claim 8, wherein the second application is a different application from the first application, the device stores second data directed to the second application to the second page of the guest memory filling the second page of the guest memory, and the supervisor is further configured to:
    copy the second data to the third page of the guest memory;
    reclaim the second page of the guest memory; and update the first device memory address of the first device PTE to map to the third page of the guest memory instead of the second page of the guest memory.

12. The system of claim 11, wherein the device is configured with a limited quantity of receiving buffers, and only configures the third page of the guest memory as a second receiving buffer after the second page of the guest memory is reclaimed.

13. The system of claim 12, wherein the second application lacks access to the second page of the guest memory.

14. The system of claim 1, wherein a request to disconnect is associated with a request to reset a virtual device that emulates the device.

15. A method comprising:
identifying, by a first application, a first page of a guest memory that is mapped, in a page table associated with the first application, to an application memory address (AMA), wherein the first page of the guest memory is accessible to the first application via the AMA,
wherein the first page of the guest memory is also mapped to a first device memory address, in a first device page table entry (PTE) of a device page table, associated with a device such that the first page is accessible to the device via the first device memory address;
communicating, in a communication session of the first application with the device, by sharing the first page with the device as a first receiving buffer in the guest memory to store first data received by the device for the first application;
detecting, by a supervisor, that the communication session is terminated such that the first application is disconnected from the device; and
responsive to detecting that the first application has disconnected from the device, updating, by the supervisor, the first device PTE to map the first device memory address to a second page of the guest memory instead of the first page of the guest memory, and copying, by the supervisor, the first data of the first page of the guest memory to the second page of the guest memory as an extra copy of the first data.

16. The method of claim 15, wherein the device has access, via corresponding device memory addresses in the device page table, to a plurality of guest memory pages in the guest memory, wherein the plurality of guest memory pages are also accessible to the first application via a plurality of AMAs associated with the first application.

17. The method of claim 15, wherein the first application lacks access to the second page of the guest memory and the first application continues to access the first page of the guest memory after the first device memory address of the first device PTE is remapped to the second page of the guest memory.

18. The method of claim 15, further comprising:
discarding data in the second page of the guest memory; and
reclaiming the second page of the guest memory.

19. The method of claim 15, further comprising:
identifying, by a second application, a third page of the guest memory to share with the device to store second data received by the device for the second application;
storing, by the device, the second data directed to the second application to the second page of the guest memory;
copying, by the supervisor, the second data to the third page of the guest memory; and
after copying the second data, updating, by the supervisor, the first device memory address of the first device PTE to map to the third page of the guest memory instead of the second page of the guest memory, wherein the device stores third data directed to the second application to the third page of the guest memory.

20. A computer-readable non-transitory storage medium storing executable instructions, which when executed by a computer system, cause the computer system to:
identify a first page of a guest memory, mapped to an application memory address (AMA) in a page table associated with an application, wherein the first page is accessible to the application via the AMA;
communicating, in a communication session of the application with a device, by sharing the first page with the device as a receiving buffer in the guest memory to store first data received by the device for the application,
wherein the first page in the guest memory is also mapped to a device memory address in a device page table entry (PTE) of a device page table associated with the device, wherein the first page is accessible to the device via the device memory address;
detecting, by a supervisor, that the communication session is terminated such that the application is disconnected from the device; and
responsive to detecting that the application has disconnected from the device, updating, by the supervisor, the device PTE in the device page table to map the device memory address to a second page of the guest memory instead of the first page of the guest memory, and copying, by the supervisor, the first data of the first page of the guest memory to the second page of the guest memory as an extra copy of the first data.

* * * * *